(12) United States Patent
Kulperger et al.

(10) Patent No.: US 6,524,487 B2
(45) Date of Patent: *Feb. 25, 2003

(54) METHODS AND COMPOSITIONS USING LANTHANUM FOR REMOVING PHOSPHATE FROM WATER

(75) Inventors: Robert Kulperger, New York, NY (US); Richard Okun, Fayetteville, NY (US); Glenn Munford, Ontario (CA)

(73) Assignee: Natural Chemistry, Inc., Stamford, CT (US)

(*) Notice: Subject to any disclaimer, the term of this patent is extended or adjusted under 35 U.S.C. 154(b) by 21 days.

This patent is subject to a terminal disclaimer.

(21) Appl. No.: 09/900,149

(22) Filed: Jul. 9, 2001

(65) Prior Publication Data

US 2002/0005382 A1 Jan. 17, 2002

Related U.S. Application Data

(63) Continuation of application No. 09/507,744, filed on Feb. 22, 2000.

(51) Int. Cl.$^7$ ................................ C02F 1/52
(52) U.S. Cl. .............. 210/723; 210/749; 210/765; 210/169; 210/906; 252/175; 252/182.33
(58) Field of Search ................ 210/632, 702, 210/723, 747, 749, 764, 765, 906, 907, 169, 170; 435/262, 262.5; 252/175, 182.3, 182.32, 182.33

(56) References Cited

U.S. PATENT DOCUMENTS

| | | | |
|---|---|---|---|
| 3,259,568 A | 7/1966 | Jordan et al. | 210/638 |
| 3,617,569 A | * 11/1971 | Daniels et al. | |
| 3,635,797 A | 1/1972 | Battistoni et al. | 210/632 |
| 3,736,255 A | 5/1973 | Ghassemi et al. | 210/711 |
| 3,758,418 A | 9/1973 | Leonard et al. | 502/348 |
| 3,850,835 A | 11/1974 | Marantz et al. | 252/179 |
| 3,956,118 A | 5/1976 | Kleber et al. | 210/711 |
| 4,213,859 A | 7/1980 | Smakman et al. | 210/638 |
| 4,701,261 A | 10/1987 | Gibbs et al. | 210/606 |
| 4,746,457 A | 5/1988 | Hassick et al. | 252/181 |
| 5,071,587 A | 12/1991 | Perman | 252/181 |
| 5,124,044 A | 6/1992 | Cassidy et al. | 210/683 |
| 5,500,131 A | 3/1996 | Metz | 210/705 |
| 5,503,766 A | 4/1996 | Kulperger | 252/174.12 |
| 5,520,811 A | 5/1996 | Dick et al. | 210/606 |
| 5,683,953 A | 11/1997 | Mills | 502/405 |
| 5,897,784 A | 4/1999 | Mills | 210/705 |
| 6,146,539 A | 11/2000 | Mills | 210/712 |
| 6,197,201 B1 | 5/2001 | Misra et al. | 210/721 |
| 6,312,604 B1 | * 11/2001 | Denkewicz, Jr. et al. | |
| 6,338,800 B1 | * 1/2002 | Kulperger et al. | |

FOREIGN PATENT DOCUMENTS

DE        25 20 210        11/1991

OTHER PUBLICATIONS

Hampton Research Material Safety Data Sheet, Praseodymium Chloride and Neodymium chloride, Date Unknown, www.hamptonresearch.com/techcenter/msds/2450M.html.*
Condensed Chemical Dictionary, 8$^{th}$ Edition, 1971, Van Nostrand Reinhold Company, p. 504.*
"Phosphates And Phosphate Substitutes In Detergents (Part 2)", Hearings before a Subcommittee of the Committee on Government Operations, House of Representatives, 92cd Congress, First Session, Oct. 29, 1971 pp. 491, 530–532, 641–646, 648, 651, 652–664, 680–694.
"Nutrient Inactivation as a Lake Restoration Procedure, Laboratory Investigations", Fig. 6, National Technical Information Service, U.S. Department of Commerce, 1974.
S. Budavari, (Ed.), The Merk Index, And Encyclopedia Of Chemicals, Drugs, and Biologicals, 5233, pp. 845–846, (1989).
Derwent Abstract Accession No. C86–076869, JP.A.61111192 (Kurita Water Ind. (KK), May 29, 1986.
Derwent Abstract Accession No. C88–096429, JP.A.63151398 (Ebara infilco KK), Jun. 23, 1998.

* cited by examiner

Primary Examiner—Fred Prince
(74) Attorney, Agent, or Firm—Wilmer, Cutler & Pickering; John W. Ryan; Christopher T. McWhinney

(57) ABSTRACT

A partially soluble lanthanide compound and methods for use in removing phosphate from water. Preferably the compound is used in removing phosphate from water in swimming pools, spas, and similar structures. Alternatively, a combination of compounds having varying solubilities may be used to remove phosphate from water. Several water treatment techniques are disclosed, as well as a variety of different methods for delivery of the active ingredients. These delivery methods include use of a slurry of the active reagent in solution as well as a tablet, powder, or granulated structure. Additionally, the water treatment techniques may incorporate the use of a combination including both enzymatic compositions and compounds for phosphate removal.

16 Claims, No Drawings

METHODS AND COMPOSITIONS USING LANTHANUM FOR REMOVING PHOSPHATE FROM WATER

This application is a continuation of application Ser. No. 09/507,744 filed Feb. 22, 2000, the subject matter of which is incorporated herein by reference.

BRIEF DESCRIPTION

This application relates generally to compounds and methods which remove phosphates from solution. More particularly, the application is directed to the use of lanthanum compounds to remove orthophosphates from water. The application is also directed to enzymatic treatment of a solution in conjunction with phosphate removal.

BACKGROUND

Algal growth includes, but is not limited to, growth of any of a number of different lower photosynthetic plants such as green algae. Often these are unicellular aquatic plants. Growth of these plants becomes problematic in swimming pools and spas as it is unsightly and often generates a disagreeable odor. The presence of such plant life may provide a gateway for growth of other organisms, some of which could be harmful to a pool's users.

Eutrophication is the gradual increase of nutrients in a body of water. The scientific community has recognized that phosphorous plays a significant role in the process of eutrophication. Further, phosphorous compounds play a role in all phases of algal metabolism, as many of these compounds are involved in energy transforming reactions. For instance, during photosynthesis, light energy is used to convert inorganic phosphate into adenosine triphosphate (ATP). ATP then serves as an energy source driving other metabolic reactions. *Phosphates and Phosphate Substitutes in Detergents (Part 2): Hearings Before a Subcommittee of the Committee on Government Operations,* House of Representatives, $92^{nd}$ Congress, Appendix 2, *Role of Phosphorus in Eutrophication,* Report of A. F. Bartsch, Director, National Environmental Research Center, Environmental Protection Agency, p. 663 (1971).

It is generally known that algal growth does not occur in swimming pools when appropriate levels of sanitizers are used and the pool water is kept near a zero or other very low phosphate level. Where algae growth is kept to a minimum, pool maintenance is greatly reduced. Sanitizers are widely known in the art, including chlorine, however, a satisfactory method for controlling phosphate levels has not been previously available.

As indicated, phosphate, more particularly, orthophosphate, is of critical importance for the growth of algae. In certain embodiments, the present invention provides an affordable, easy method for removing phosphates from water. Swimming pools are constantly exposed to a wide variety of contaminants, from rain and runoff, windblown dust and dirt particles, and even the pool occupants themselves. These contaminants provide a constant influx of phosphate into the pool. Thus, a need arises for a technique to remove these phosphate on a continuing basis.

While certain chemical methods to bind dissolved compounds for their removal from water are known, none incorporate all of the advantages and benefits presented in the embodiments of this invention. U.S. Pat. No. 5,897,784 ("the '784 patent") to Dudley Mills teaches, among other things, methods and compositions for treating swimming pool water by removing one or more nutrients necessary for algal growth. Another Dudley Mills U.S. Pat. No. 5,683,953, ("the '953 patent"), also teaches methods and compositions for treating swimming pool water by removing one or more nutrients necessary for algal growth.

The '784 and '953 methods and compositions do not incorporate all of the benefits and advantages of the present invention. Certain embodiments of the present invention relate to partially soluble phosphate scavengers. The solubility of the selected reactant is of particular importance as solubility is directly related to the rate of the reaction as a whole, or reaction rate. Reaction rate refers to the number of reactions, on a molecular level, that reach completion in a given time period. While a given reaction will proceed at the same rate on a molecular level, the reaction rate will differ with relation to, among other things, the solubility of the reactants. Thus, one disadvantage of the known methods and compositions is that because of their insolubility, the reactants are slow-acting. As a result, it may take days, or even weeks, for a reaction to have progressed to the degree that it becomes useful.

In other instances, only the molecules on the surface of the particle may react with the target ion or compound, and as such, the compound's reaction is limited by its available surface area. Once the entirety of surface molecules of a given particle have reacted, those unreacted molecules on the interior of the particle are unable to react, as these unreacted molecules are effectively sealed within the particle. The net result is that a much greater amount of reactant compound need be used in order to react with a given amount of phosphate, as only the available surface area of any particle is reactive. This causes greater cost and inconvenience to the user.

Among other things, the phosphate removal rate in swimming pools is dependent upon the turnover rate of the water, or the amount of water that passes over the filter in a given time. The total time it takes to achieve a desirable level of phosphate depends on both the phosphate removal rate and the initial level of phosphate present in the water. Using the previously available technology, removal of phosphates may occur so slowly that it is ineffective. The end result is increased difficultly and expensive in maintaining a pool or spa. The highly effective and rapid method for removing phosphates described herein provides a solution to these previously unsolved problems.

It is also known in the prior art to employ a lanthanum compound with a high solubility in water. An example of such a compound is $LaCl_3$. While the use of such a compound does have certain benefits, namely that the phosphate becomes bound as insoluble lanthanum phosphate relatively quickly, it also has certain disadvantages. The increased solubility of the reactant allows is to quickly diffuse throughout the aqueous body to which it is added. The amount of lanthanum that immediately reacts is limited only by the amount of available phosphate, and because the reaction takes place on a relatively large scale, a large amount of phosphate may react to form lanthanum phosphate over a short period of time. In this circumstance, the insoluble lanthanum phosphate creates a visible clouding of the water. As it reacts with the phosphate, the insoluble lanthanum phosphate precipitates out as a very fine white compound. The particles formed are too small to be removed with a conventional filter, and often require significant effort to remove. Further, if an excess of the compound is added, various side reactions may occur, including the formation of other precipitates that are similarly distributed throughout the pool, and difficult to remove.

This is of tremendous importance, as certain embodiments of the present invention may be used to rapidly remove phosphates from water and then maintain the water at a zero or near-zero phosphate level. Such a condition is highly desirable for pool water chemistry. This is achieved without forming significant amounts of insoluble lanthanum phosphate throughout the pool water, as is observed when a high solubility reactant is used. More specifically, this is achieved by only using reactants of suitable solubility, resulting in a reaction that proceeds neither too quickly nor too slowly. In addition, the bulk of the reaction takes place on or within the filter, and the insoluble lanthanum phosphate is trapped therein. Certain embodiments of the present invention are equally effective for use in maintaining a pool's water clarity and purity over a longer period of time, as the amount of reactant in the water system at any given time may be replenished.

A variety of compounds useful for enzymatic treatment of the water are described in U.S. Pat. No. 5,503,766. The compounds include a cleaner or water clarifier primarily comprising an enzyme composition and a saponin as active ingredients. When used alone, these compositions are effective at reducing pool maintenance, however when a treatment program using such compositions is employed together with phosphate scavenging, additional benefits are obtained, provided normal sanitation of the pool is maintained.

The present invention provides many advantages over the previously known methods and compositions for treating pool water. One of these is that the present invention is fast-acting and avoids the undesirable side effects of the known art. These side effects include the formation of undesirable compounds such as lanthanum hydroxide, a milky, insoluble material that proves very difficult to remove from a pool without a great deal of time, effort and even chemical treatment of the water. Such side effects are typical when a phosphate reactant with a high solubility is employed. In these instances, the reactant is quickly dispersed throughout the pool and the removal of phosphates occurs rapidly. The cost of such a quick reaction however, is that the phosphate-containing insoluble reaction product is a particulate product too small in size to be removed by filtration. This particulate reaction product clouds the water. Where the product of such a reaction is lanthanum phosphate, the result is a very fine, white, insoluble material. In such instances, often a clarifier must be used to clear the water. Additionally, some of the unrecoverable insoluble reaction product eventually settles to the bottom of the pool, and must be removed by vacuuming or some other means.

Deposits often accumulate on the sides of a pool creating an unsightly waterline ring. These deposits include material with a density lower than that of water such as oil and other sun-care products that bathers may apply to their skin, as well as particulate material that collects on the sides of a pool. Additionally, these deposits may encourage the growth of living plants such as algae. Certain embodiments of the present invention are of particular use in avoiding such deposits. Cleaning of this waterline ring often requires physically scrubbing away any deposits, and allowing the water filter to remove the resulting contaminant or vacuuming away the settled material, or using other chemical means to aggregate the contaminant. Such scrubbing is not only labor-intensive, it may also cause damage to the pool. For example, scrubbing often incorporates the use of abrasive material, which might damage the liner or tile installed in the pool.

Certain embodiments of the invention are also helpful in maintaining a pool as they help avoid the filter's becoming clogged with suspended debris. Pools often rely on chemical and mechanical filtration to remove undesired contaminants from the water. When clogged, the effectiveness of these filters is compromised and water quality may quickly deteriorate. The usable life of the filter is also increased when the filter is kept free of blockages. Further benefits of compositions and methods of this invention include the elimination of strong chemical odors often associated with swimming pools and an increased clarity in the treated water.

The combination of enzymatic compounds with that of phosphate removal results in a realization of benefits much greater than those one might otherwise predict from the combination. One overall result is an unexpected increase in the effectiveness of the treatment program. The water in pools and spas treated in this manner is kept clear and odor-free. The necessity of chemically shocking the water with chlorine or other harsh chemicals becomes less frequent. Further, the water is not irritating to the skin, eyes, and mucous membranes of the pool or spa users. In frequently used facilities the above benefits have reduced the amount of cleaning and maintenance by 50% or more. The combination presents an approach to pool or spa maintenance that is highly effective and thus superior to any known treatments.

SUMMARY OF THE INVENTION

The present invention includes methods and compositions for removing phosphate from water. Maintenance of a level of orthophosphates, in particular, below 100 parts per billion is highly desirable for pool owners and maintainers. Additionally, certain embodiments relate to methods and compositions that include the combination of removing phosphates and enzymatically treating water. These embodiments work, in part, by reacting any phosphates in the water to form an insoluble reaction product that is easily removed from the water using traditional water cleaning devices. Such devices may include, by way of example, a mechanical apparatus such as a water filter. By eliminating or suppressing the phosphate level to near zero, the pool will require far less maintenance and upkeep, both in terms of working hours and money. A novel feature of certain embodiments is that the phosphate scavenging occurs on or within the filter so that the reaction product is easily removed. The novel combination of removing phosphates from water and adding an enzymatically active composition greatly reduces the labor and resources required to maintain the clarity and cleanliness of an aqueous body, when adequate sanitation is maintained.

One embodiment relates to a method for purifying a solution having as a first step reacting a partially soluble lanthanide compound with an impure solution. As is described herein, other embodiments are not limited to partially soluble lanthanide compounds and may include combinations of lanthanide compounds having different solubilities. A second step includes allowing the reagent to react with impurities in the solution to form a reaction product. Finally, the reaction product is removed from the solution.

The reduction of phosphates in the water is achieved by contacting the water with a lanthanum compound that reacts with a phosphate to form the insoluble compound lanthanum phosphate.

DETAILED DESCRIPTION OF THE INVENTION

The invention relates to chemical compositions and methods of use for these compositions. In one embodiment, the composition includes a slurry of one or more rare earth salts in water. Preferably, the rare earth salt is a lanthanide compound, even more preferably the rare earth salt is lanthanum sulfate. The characteristic partial solubility of lanthanum sulfate enables this composition to be particularly suited for the application of reacting with phosphate in water. The preferred method of use for this embodiment is to allow the lanthanum sulfate to react with any impurities in the water to form an insoluble reaction product, and then remove the product of this reaction from the water. The invention is useful for removing these impurities from any body of water, including swimming pools, spas, and hot tubs. Alternatively, it may also be used in smaller aqueous bodies, such as aquariums.

The methods disclosed herein include the use of a reagent which may be any of a number of partially soluble lanthanide compounds. These compounds can be used to bind and remove phosphates such that the level of phosphate in the water being treated is about 50 parts per billion or less. At these levels, maintenance becomes far less work intensive. Preferably, the phosphates removed from the water through these processes are orthophosphates.

For purposes of this disclosure solubility refers to that characteristic of a compound defining the degree to which it dissociates to become molecularly or ionically dispersed in a solvent to form a true solution. Preferably, the solvent is water. Solubility of a substance is measured by the maximum amount that can be dissolved in a solvent at a given temperature and pressure. Under normal conditions of temperature and pressure, the solubility of a preferred reactant, lanthanum sulfate, is at or about 3%.

The partial solubility of the reagent permits the reduction in the level of phosphate to occur at an optimal rate. This rate is directly proportional to the amount of lanthanum phosphate reactant produced. Further, the bulk of this reaction occurs on or within the filter. In this manner, the lanthanum phosphate is trapped within the filter and is easily removed from the filter. Were the reagent to have a solubility greater than that of the present embodiment, the overall reaction would proceed too fast. Importantly, such a reaction would occur throughout the pool, as the highly soluble reagent would diffuse throughout the pool. The result is an insoluble lanthanum phosphate precipitant throughout the system. As previously indicated, this particulate material creates a cloudy appearance in the water where it is suspended, and quite often the appearance of debris on the floor of the water vessel or container. Alternatively, if the reagent were to have a lower solubility, the overall reaction proceeds too slowly and phosphate is not removed from the system at a fast enough rate. This includes the case where the rate of phosphate removal from the system is less than the rate of phosphate introduction to the system, as well as the case where phosphate removal would simply take too extended a period to reach the desired levels of phosphate. Where a substantially insoluble compound is used as a reagent, the phosphate binding ability of that compound may be limited by the available surface area of the reagent. In particular, once the surface molecules of the compound are bound to phosphates, the overall reaction will stop; the surface molecules being those molecules located at the outermost surfaces of the compound such that they are able to react with proximate phosphates.

In another embodiment of the invention, a lanthanum sulfate solution is created by reacting lanthanum chloride with alum in water. Preferably, the alum employed is chiefly comprised of aluminum sulfate. This forms a slurry characterized by a combination of both particulate and dissolved lanthanum sulfate. Lanthanum sulfate's solubility being about 3%, only a small portion of the compound is dissolved into solution. Alternatively, a rare earth salt having a solubility from about 0.5% to 50% may be used, and more preferably for this embodiment, a lanthanide compound having a solubility from about 1.5% to 10% may be employed. The soluble portion is able to react immediately with any phosphate contaminant. As this reaction occurs, the amount of lanthanum sulfate in solution decreases, and more of the insoluble lanthanum sulfate reagent may go into solution to react with the phosphate contaminant. Further, those molecules at the surface of the lanthanum sulfate particle may react to form insoluble lanthanum phosphate, effectively trapping the lanthanum sulfate within the particle. This process can effect a limit on the rate of lanthanum phosphate formation, and avoids the creation of visible lanthanum phosphate precipitate in the water, while at the same time allowing the overall reaction to proceed at an effective rate, on or within the filter. Alternatively, as it is formed, the insoluble reaction product will leave the lanthanum particle, thereby making available unreacted lanthanum sulfate to react with the phosphates.

In another embodiment, lanthanum sulfate is added directly to the water. Preferably, the lanthanum sulfate is in the form of a powder having particles of approximately 5–150 microns in size. The compound is added on the intake side of the filter, so that it is pumped toward the filter. For instance, the powder may be added to the pool's skimmers such that it is carried directly toward the filter.

As described, the preferable method is to place the partially soluble lanthanide compound into the pool water system such that the lanthanide compound is drawn into the filter. The partially soluble lanthanide compound may, for example, be added directly to one or more skimmers in a pool. The lanthanide particles are then trapped by the filter. In this manner, water from the pool is continuously circulated over and around the lanthanide compound particles. These particles are then able to react to form insoluble lanthanum phosphate. On occasion, these particles may be removed from the filter by backwashing or other suitable means. In such instances, the backwashing acts as the last step in removing the phosphates from the pool.

These methods can be used to reduce undesirably elevated levels of phosphate as part of the water quality maintenance for a pool or other facility. The methods that have proved successful in treating elevated phosphate levels include first measuring the concentration of phosphate in the water. Water testing kits are commercially available to serve this purpose. Following this, the lanthanide reagent, preferably lanthanum sulfate, is introduced to the water to be treated and the combination is allowed to react. Alternatively, lanthanum nitrate may be employed for this purpose, however it has the disadvantage of being hazardous to transport as it poses an explosion and fire risk. After allowing the reaction to proceed over a varying course of time, depending on the amount of phosphate in the water and the amount of lanthanide reagent added, the lanthanum phosphate may be removed by filtration or other means as necessary. Preferably, an excess of the stoichiometrically calculated equivalent of the compound necessary to treat the total amount of phosphate is added. Even more preferably, the amount of compound added is about 1.5 times the stoichiometrically calculated equivalent. Adding a predetermined amount of reactant compound is both cost effective in terms of reagent expense, and avoids the possibility of forming a fine, unfilterable lanthanum phosphate composition which may be difficult to remove. This method is preferably employed only after algal growths have been treated with an appropriate sanitizer. The sanitizer, while not part of the invention disclosed herein, acts to kill the algae in the pool, thereby releasing into the water any phosphates the algae may contain. Algae are known to absorb a greater amount of phosphates than they require, through a process termed luxury uptake. For this reason, the phosphate levels are to be measured only after the algae have been killed, and all of the phosphates have thereby been released into the water.

In another embodiment of the invention, the lanthanum compound may be placed in the water system and left there to react with the phosphates. This process can be repeated as necessary to maintain a low or relatively low phosphate concentration. Preferably this concentration is kept at or below 50 parts per billion. Again, the reagent is preferably placed so that it is drawn into the water filter. The reagent is preferably added in the form of either a slurry or a powder. Alternatively, it may be in a granulated form.

The reagent may also be constructed in the form of a pill or tablet. When in the form of a pill or tablet the reagent may be combined with any of a variety of binders. These binders may be inert or may include chemically active compounds. The pill or tablet may then be constructed so that it dissolves slowly over the course of a predetermined length of time. Alternatively, the pill or tablet may constructed using high pressure, as in the case of a mechanical press. In such instances, the reactive compound is exposed to high pressure over a predetermined length of time such that a pill or tablet is formed. Other methods of creating a pill or tablet from granulated or powdered compositions are similarly suited for use with the lanthanum compounds disclosed herein. In this embodiment, the lanthanum compound within the pill or tablet is slowly released into the water to control phosphate levels over some greater time period without additional user intervention.

In yet another embodiment, the reagent-containing composition may be in the form of a tablet, powder, slurry, or it may be granulated. This composition may include both lanthanum sulphate and another lanthanum compound of a different solubility. Alternatively, the reagent-containing composition may simply be comprised of multiple lanthanum compounds having varying solubilities. This would include, by way of example, a combination of lanthanum sulphate and lanthanum carbonate. Other combinations of lanthanides having different solubilities would also be effective. This would include for instance, a combination of lanthanum sulfate and lanthanum carbonate. In other embodiments the reagents might have solubilities more similar or less similar than those listed in the examples. By incorporating multiple lanthanum compounds with variant solubilities, the release of lanthanum ions into solution could be controlled such that one dose of the reagent could remove phosphate rapidly, upon introduction to the water body, and over a longer period, for removal of those phosphates that are constantly entering the pool. For instance, if lanthanum sulfate were employed, some of it would dissolve into the water body quickly and remove the initial concentration of phosphates in the water while the more slow dissolving lanthanum carbonate would last for weeks, releasing lanthanum ions into the water over a longer period of time to slowly remove the small amounts of phosphates entering the pool from other sources. Thus, a tablet constructed in this manner could treat a pool for perhaps an entire month. Alternatively, such a composition could be in the form of a powder, a slurry, or in a granulated form.

In yet another embodiment, a pool or spa is treated with both a reagent to remove phosphates as well as an enzymatic cleaning or water clarifying solution. The phosphate-removing reagent may include multiple lanthanide compounds, having varying solubilities, as previously discussed. While the lanthanum compound serves chiefly the same purpose as previously indicated, the enzymatic solution or enzyme-based composition provides improved cleansing and water clarifying capabilities.

The preferred enzyme-based compositions are environmentally safe in that their components are natural products or are biodegradable. These compositions include a surfactant and a selected enzyme mixture. Preferably the surfactant in the composition is saponin, which may be present in the form of Yucca Extract from Yucca Schidigera.

The composition of this embodiment comprises an enzyme-based aqueous composition containing a minor amount of saponin. In particular, this embodiment relates to a composition containing a major amount of water and a minor amount of an active ingredient combination of an enzyme, saponin and a bacterial inhibiting stabilizer. In a preferred embodiment, the active ingredient combination comprises less than 50 percent by weight of the composition, and of that combination, a major amount is enzyme and a minor amount comprises the saponin and the bacterial inhibiting stabilizer. In more preferred embodiment, the active ingredient combination comprises from about 0.05 to about 10 weight percent of the composition, more preferably from about 1 to about 10 weight percent of the composition, the remainder being water. Of the active ingredient combination, about 99 to about 70 weight percent is enzyme and about 0.05 to about 30 weight percent is the saponin. Additionally, about 0.01 to about 10 weight percent of the composition may be a bacterial inhibiting stabilizer.

Suitable enzymes include the family of enzymes, e.g., lyase, isomerase, ligase, oxidoreductase, transferase and hydrolase. A desirable enzyme mixture includes lipase, α-amylase and protease activities. A preferable enzyme mixture is sold under the trade name POOLZYME by Natural Enzymes, Inc., of Cambellford, Ontario, Canada.

The bacterial inhibiting stabilizer for the cleaning and clarifying compositions can vary, depending upon the specific application for which the composition is designed. A matter to be considered is the pH of the enzyme solution that is modified by this invention. Generally, the enzyme solution is mildly acidic, typically having a pH ranging from about 3.5 to about 4.5. However, the solution can be alkaline, even to a pH of 10–11, regardless of the pH of the solution a suitable stabilizer must be included in order avoid bacterial growth and preserve the composition. Essentially, the stabilizer acts as a preservative.

A preferred enzymatic composition for spa use is formulated in the following manner: between 1.2 and 4 percent by weight of POOLZYME, an aqueous mixture of enzymes and surfactant is combined with between 0.2–0.8 percent of Yucca extract, sold by Brookside Agra, of Highland, Ill. and water is added to 100 L. SURCIDE P, is added as a bacterial inhibiting stabilizer and is sold by, Surfactants, Inc., of South Plumfield, N.J. This compound is added to a concentration of 0.12 kg per 100 L of solution.

A preferred enzymatic composition for pool use is formulated in the following manner: between 7 and 15 percent by weight of POOLZYME is combined with between 0.4–1.6 percent by weight of Yucca Extract and water is added to 100 L. SURCIDE P, is added as a bacterial inhibiting stabilizer to a concentration of 0.12 kg per 100 L of solution.

This enzymatic composition is then used in conjunction with the aforementioned phosphate scavenger. The result is a highly effective treatment method for pools, spas, and other suitable aqueous bodies. The combination of low phosphate levels and contaminant-free water results in a pool that has clean, clear, odor-free water. Such a condition is highly desirable for pool owners and users, and is achieved with relative ease using the methods and compositions taught herein. As previously indicated, in highly populated pools, the use of these methods can reduce pool maintenance up to 50 percent.

EXAMPLES

The following examples further illustrate and exhibit certain embodiments of the invention. These examples are provided in order to further clarify the invention and do not prescribe any limits, implied or otherwise, on the aforementioned methods and compositions. It is noteworthy that throughout these tests, no precipitate was visible within the water. It is believed that the bulk of the reaction forming lanthanum phosphate occurred on or within the water filter.

Example 1

A test tank with a capacity of approximately 1100 liters was fitted with a HAYWARD® sand filter. The filter was approximately 0.09 square meters and contained approximately 18 kg of coarse sand. An identical tank was fitted with a HAYWARD® cartridge filter, as is typically used with swimming pools. This particular unit was installed in lieu of the sand filter and had a surface area of approximately 2.32 square meters. Water is then drawn through the filters using a pump. Each unit was fitted with necessary plumbing to permit test samples of reactant to be added upstream of the filter, to simulate adding the reactant to the skimmer in a full-sized pool. In this way, the reactant could be drawn through the plumbing and into or onto the filter. In this test orthophosphate, in the form of $Na_2HPO_4$, was used to simulate the increased phosphate level present in the water. The following table summarizes the chemistry of the water before the test, the amount of reactant that was added to the system, and the results.

TABLE 1

Efficacy test of high-purity reactant

| Characteristic | Measurement | Comment |
|---|---|---|
| Volume of water | 1135 L | |
| Temperature of water | approximately 24° C. | |
| Phosphate added | approximately 0.79 g | This created a phosphate level of approximately 800 ppb |
| Total $Cl_2$ | 0.5 ppm | |
| Hardness | 200 ppm | |
| Alkalinity | 100 ppm | |
| Meter pH | 7.9 | As measured by an electronic pH meter |
| Paper pH | 7.4 | As measured by pH-sensitive paper |

A total of 3.5 g of reagent grade (99.9% pure) $La_2(SO_4)_3$ was suspended in 50 ml of tap water. This suspension was added upstream of the filter, thus it was drawn toward and into the filter. After 2 hours of continuous pump operation at approximately 75 liters per minute, 0.65 g of $PO_4$ were removed. The predicted stoichiometric ratio of $PO_4$ to La was 0.69 while the ratio observed in the experiment was 0.38.

Example 2

The same experiment as that described in Example 1 was performed, under the same conditions, except that commercial grade (approximately 99.5% purity) $La_2(SO_4)_3$ was used in lieu of reagent grade lanthanum compound. The amount of phosphate compound was slightly increased in this experiment as well, namely 0.8 g of $Na_2HPO_4$ being added to the water prior to the experiment. The results of this experiment indicated that the ratio of $PO_4$ recovered to La added was 0.35. This ratio is only slightly less than that achieved with a higher purity lanthanum compound, displaying that the difference in purity is negligible in terms of the effectiveness of the reactant in scavenging phosphate.

In both Example 1 and Example 2, similar results were obtained regardless of which filter was employed. However, in order to achieve the same recovery ratio as the sand filter, the cartridge filter had to be run a longer time period.

Example 3

In this experiment, both water tanks described above were used, each with its own filter, one using the aforementioned sand filter and the other using the cartridge filter. The tanks are hereafter referred to as Tank A and Tank B. Both filters were backwashed so as to remove any material collected in or on the filters and run in excess of 12 hours. The reactant was prepared in the form of a slurry with a total of 2 L being prepared. The slurry was prepared by combining 18.5 g $LaCl_3$ dissolved in 1200 mL water at 35° C. (pH 4.2) with 304.3 g liquid alum (a 48.5% $Al_2(SO_4)_3$ solution in water) at 38° C. and a pH of 1.5. Following this combination the temperature was measured at approximately 37° C., and the pH at 2.8. Initially a suspension of fine, white, almost pearlescent solids was observed. At or before 15 minutes of stirring, noticeably white solids appeared, but did not appear heavy or sandy. The preparation of the slurry continued with 30 minutes of stirring.

Each tank was then refilled with water to reach its 1100 L capacity and the phosphate levels were adjusted by addition of $Na_2HPO_4$ to the total measurable concentration indicated in Table 2.

TABLE 2

Efficacy test of Partially Soluble Lanthanum compound

| Characteristic | Tank A | Tank B |
|---|---|---|
| Initial $PO_4$ | 0.98 ppm | 0.93 ppm |
| Total $Cl_2$ | 0.5 ppm | 0.5 ppm |
| Hardness | 200 ppm | 200 ppm |
| Alkalinity | 100 ppm | 100 ppm |
| Meter pH | 7.9 | 8.0 |
| Paper pH | 7.4 | 7.6 |

A predetermined amount of the slurry was then added to each tank, 75.6 g being added to Tank A and 54.1 g in Tank B. Table 3 summarizes the results of this test.

TABLE 3

Results of Partially Soluble Lanthanum Compound Test*

| Characteristic | Tank A | Tank B |
|---|---|---|
| $PO_4$ concentration at 1 hour | 0.11 ppm | 0.20 ppm |
| $PO_4$ concentration at 2 hours | 0.07 ppm | 0.17 ppm |
| Total $Cl_2$ | 0.5 ppm | 0.5 ppm |
| Amount of slurry added | 75.6 g (2.6 gLa) | 54.1 g (1.7 gLa) |

TABLE 3-continued

Results of Partially Soluble Lanthanum Compound Test*

| Characteristic | Tank A | Tank B |
|---|---|---|
| Total $PO_4$ removed | 1.04 g | 0.87 g |
| Reduction in $PO_4$ concentration | 0.91 ppm | 0.76 ppm |
| Ratio of $PO_4$ removed/La added | 0.4 | 0.51 |

*These results indicate the slurry's effectiveness in the process of removing $PO_4$ from water.

The slurry containing the partially soluble lanthanum compound had reacted to reduced the $PO_4$ concentration in the water significantly within the first hour following its introduction to the water tank. Further, the reaction continued through the second hour, and although actual data was not measured, the reaction would continue indefinitely to reduce the $PO_4$ concentration until either the lanthanum compound was expended, or the $PO_4$ concentration reached a level of zero.

These experiments demonstrate that partially soluble lanthanum compounds effectively react with phosphates in conditions similar to those encountered in swimming pools. As previously noted, the reaction product is lanthanum phosphate, an insoluble compound which may then be removed using various known filtration methods.

While the invention has been described and disclosed in various terms and certain embodiments, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for purifying swimming pool water comprising the steps of:
   (a) introducing a reagent comprising a lanthanide compound to an impure solution, wherein the lanthanide compound is characteristically only partially soluble;
   (b) allowing the reagent to react with those impurities in the solution to form a reaction product; and
   (c) removing the reaction product from the solution.

2. A method according to claim 1 wherein said lanthanide compound comprises lanthanum sulfate, and the impurities in the impure solution comprise a phosphate, and the reaction product is insoluble.

3. A method according to claim 2 wherein the reagent is in a form selected from the group consisting of a slurry, a tablet, a powder, or is granulated.

4. A method according to claim 1 wherein the impurities comprise an orthophosphate.

5. A method according to claim 1 wherein the water is spa water.

6. A method according to claim 1 further including the step of:
   isolating the insoluble reaction product from the impure solution using a filter means between steps (b) and (c).

7. A method according to claim 1 wherein the reagent comprises a plurality of lanthanum compounds of varying solubilities.

8. A method according to claim 7 wherein the reagent is in a form selected from the group consisting of a slurry, a tablet, a powder, or is granulated and comprises:
   (a) a relatively high solubility lanthanide compound, and
   (b) a relatively low solubility lanthanide compound.

9. The method of claim 7 comprising the additional initial steps of:
   (a) determining the amount of phosphate to be removed from the water;
   (b) determining the stoichiometric equivalent amount of reagent required to react with the phosphate;
   (c) adding an amount of reagent that exceeds the stoichiometric equivalent amount of reagent required to react with the phosphate.

10. The method of claim 1 wherein the lanthanide compound is from about 0.5% to about 50% soluble in water.

11. The method of claim 1 wherein the lanthanide compound is from about 1.5% to about 10% soluble in water.

12. The method of claim 1 wherein the lanthanide compound is about 3% soluble in water.

13. A method for purifying swimming pool water comprising the steps of:
   (a) introducing a reagent comprising a lanthanide compound to an impure solution, wherein the lanthanide compound is from about 0.5% to about 50% soluble in water;
   (b) allowing the reagent to react with those impurities in the solution to form a reaction product; and
   (c) removing the reaction product from the solution.

14. A method for purifying swimming pool water comprising the steps of:
   (a) introducing a reagent comprising a lanthanide compound to an impure solution, wherein the lanthanide compound is from about 1.5% to about 10% soluble in water;
   (b) allowing the reagent to react with those impurities in the solution to form a reaction product; and
   (c) removing the reaction product from the solution.

15. A method for purifying swimming pool water comprising the steps of:
   (a) introducing a reagent comprising a lanthanide compound to an impure solution, wherein the lanthanide compound is about 3% soluble in water;
   (b) allowing the reagent to react with those impurities in the solution to form a reaction product; and
   (c) removing the reaction product from the solution.

16. A method for purifying swimming pool water comprising the steps of:
   (a) determining the amount of phosphate to be removed from the water;
   (b) determining the stoichiometric equivalent of reagent required to react with the phosphate;
   (c) introducing a reagent comprising a plurality of lanthanum compounds of varying solubilities to an impure solution, wherein the lanthanide compounds are characteristically only partially soluble, said reagent being introduced in an amount that exceeds the stoichiometric equivalent amount of reagent required to react with the phosphate
   (d) allowing the reagent to react with those impurities in the solution to form a reaction product; and
   (e) removing the reaction product from the solution.

* * * * *